(12) United States Patent
Caren et al.

(10) Patent No.: US 6,797,469 B2
(45) Date of Patent: Sep. 28, 2004

(54) METHOD OF PERFORMING ARRAY-BASED HYBRIDIZATION ASSAYS USING THERMAL INKJET DEPOSITION OF SAMPLE FLUIDS

(75) Inventors: Michael P. Caren, Palo Alto, CA (US); Kevin J. Luebke, Dallas, TX (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/819,923

(22) Filed: Mar. 26, 2001

(65) Prior Publication Data

US 2001/0016322 A1 Aug. 23, 2001

Related U.S. Application Data

(63) Continuation of application No. 09/300,589, filed on Apr. 27, 1999, now Pat. No. 6,221,653.

(51) Int. Cl.[7] ............ C12Q 1/68; C12P 19/34; C12M 1/34; C07H 21/02; C07H 21/04

(52) U.S. Cl. ............ 435/6; 435/7.1; 435/91.1; 435/91.2; 435/287.2; 536/22.1; 536/23.1; 536/24.3; 536/24.31; 536/24.32; 536/24.33; 422/100; 347/56

(58) Field of Search ............ 435/6, 7.1, 91.1, 435/91.2, 287.2; 536/22.1, 23.1, 24.3, 24.31, 24.32, 24.33; 422/100; 347/56

(56) References Cited

U.S. PATENT DOCUMENTS

| | | | |
|---|---|---|---|
| 4,877,745 A | | 10/1989 | Hayes et al. |
| 5,338,688 A | * | 8/1994 | Deeg et al. ............ 436/180 |
| 5,449,754 A | | 9/1995 | Nishioka |
| 5,474,796 A | | 12/1995 | Brennan |
| 5,658,802 A | | 8/1997 | Hayes et al. |
| 5,700,637 A | | 12/1997 | Southern |
| 5,958,342 A | * | 9/1999 | Gamble et al. ............ 422/100 |
| 6,001,309 A | | 12/1999 | Gamble et al. |
| 6,070,969 A | | 6/2000 | Buonanno |
| 6,132,030 A | * | 10/2000 | Cornell ............ 347/57 |
| 6,221,653 B1 | * | 4/2001 | Caren et al. ............ 435/287.2 |

OTHER PUBLICATIONS

U.S. patent application Ser. No. 09/150,504, Caren, filed Sep. 9, 1998.

* cited by examiner

Primary Examiner—Jeffrey Siew

(57) ABSTRACT

Methods are provided for depositing a quantity of fluid onto the surface of an array. In the subject methods, a thermal inkjet head loaded with the fluid is positioned in opposing relationship to, e.g. over, the array surface. Actuation of the thermal inkjet results in the expulsion of a quantity of fluid onto the array surface. The subject methods find particular use in array-based binding assays in which an array of binding agents is employed for the detection of an analyte (s), particularly array-based hybridization assays.

23 Claims, 1 Drawing Sheet

10

20

METHOD OF PERFORMING ARRAY-BASED HYBRIDIZATION ASSAYS USING THERMAL INKJET DEPOSITION OF SAMPLE FLUIDS

CROSS REFERENCE TO RELATED APPLICATIONS

This application is a continuation of application Ser. No. 09/300,589 filed on Apr. 27, 1999 and now issued as U.S. Pat. No. 6,221,653; the disclosure of which is herein incorporated by reference.

TECHNICAL FIELD

The field of this invention is nucleic acid arrays.

BACKGROUND OF THE INVENTION

"Biochips" or arrays of binding agents, such as oligonucleotides and peptides, have become an increasingly important tool in the biotechnology industry and related fields. These binding agent arrays, in which a plurality of binding agents are deposited onto a solid support surface in the form of an array or pattern, find use in a variety of applications, including gene expression analysis, drug screening, nucleic acid sequencing, mutation analysis, and the like.

In array-based assays in which an array of binding agents is employed, the array is typically contacted with a fluid sample that is suspected of containing the analyte(s) of interest. In currently employed protocols, contact of the array with the sample fluid is achieved in a number of different ways. Thus, a fluid sample may be contacted with the surface of the array using a pipette. In other embodiments, the sample may be flowed over the surface of an array by injecting the sample through a septum. In yet other embodiments, the sample may be flowed over the surface of the array using surface tension, centrifugal force or pressure differentials.

Although effective, there are drawbacks associated with each of the above techniques. First, each of the above techniques requires the deposition of relatively large sample volumes, e.g. greater than 2 μl. Second, such techniques provide little or no spatial resolution of sample presentation. Third, sample pre-manipulation or pretreatment, e.g. heating, dilution, etc., is difficult.

As such, there is continued interest in the development of new methods of depositing sample volumes onto array surfaces. Of particular interest would be the development of a sample deposition method capable of depositing relatively small quantities of sample on the array surface in a manner in which the position of deposition can be controlled.

Relevant Literature

U.S. Patents disclosing the use of inkjet devices to dispense bio/chemical agents such as proteins and nucleic acids include: U.S. Pat. Nos. 4,877,745; 5,338,688; 5,474,796; 5,449,754; 5,658,802; and 5,700,637.

SUMMARY OF THE INVENTION

Methods for depositing small quantities of a fluid sample onto the surface of an array are provided. In the subject methods, a thermal inkjet device is employed to expel a quantity of a fluid sample onto the surface of an array. The subject methods find use in array-based assays, particularly array-based analyte detection assays, e.g. differential gene expression assays, gene identification assays, nucleotide sequencing assays, and the like.

DEFINITIONS

Figures 1A, 1B:
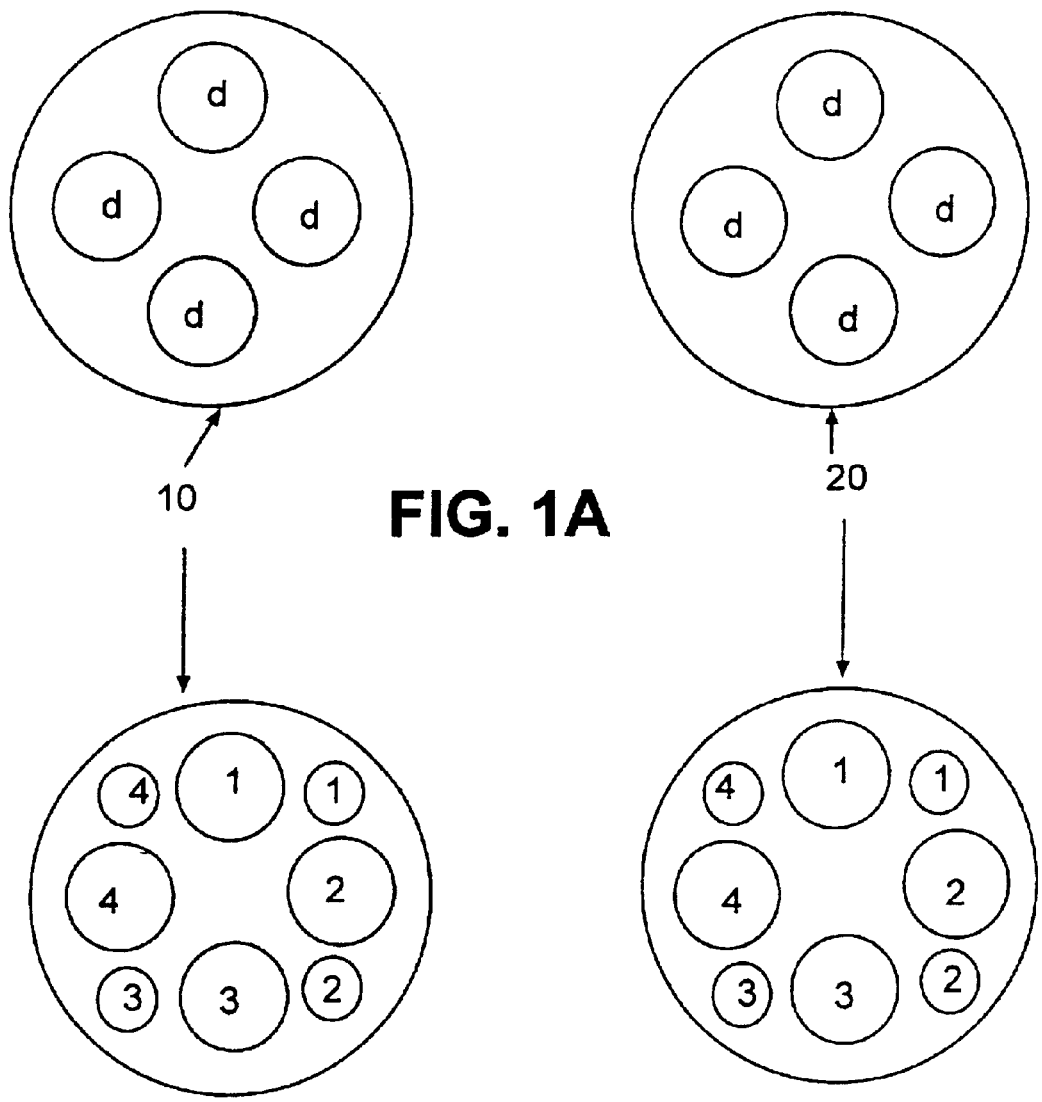
FIG. 1A provides a representation of the deposition profile of a diluent solution onto two features(i.e. nucleotide spots) of an array.
FIG. 1B provides a representation of the deposition profile of four different sample solutions deposited onto the two features of an array shown in FIG. 1A.

The term "nucleic acid" as used herein means a polymer composed of nucleotides, e.g. deoxyribonucleotides or ribonucleotides.

The terms "ribonucleic acid" and "RNA" as used herein mean a polymer composed of ribonucleotides.

The terms "deoxyribonucleic acid" and "DNA" as used herein mean a polymer composed of deoxyribonucleotides.

The term "oligonucleotide" as used herein denotes single stranded nucleotide multimers of from about 10 to up to about 100 nucleotides in length.

The term "polynucleotide" as used herein refers to a single or double stranded polymer composed of nucleotide monomers of generally greater than 100 nucleotides in length and up to about 8,000 or more nucleotides in length.

The term "cDNA" as used herein means a complementary DNA molecule made as a copy of mRNA amplified using PCR for deposition on arrays. cDNAs can range from about 100 bp to about 8,000 bp, where average cDNAs are typically 1 to 2 kb in length.

The term "array" as used herein means an substrate having a plurality of binding agents stably attached to its surface, where the binding agents may be spatially located across the surface of the substrate in any of a number of different patterns.

The term binding agent means any agent that is a member of a specific binding pair, where such agents include: polypeptides, e.g. proteins or fragments thereof; nucleic acids, e.g. oligonucleotides, polynucleotides, and the like; etc.

DESCRIPTION OF THE SPECIFIC EMBODIMENTS

Methods are provided for depositing a quantity of a fluid sample onto the surface of an array. In the subject methods, a thermal inkjet head loaded with the fluid sample is positioned in opposing relationship to, e.g. over, an array surface. The temperature of the heating element of the inkjet head is then raised such that a bubble is formed at the surface of the heating element and a quantity of the fluid sample is expelled from the head onto the array surface. The subject methods find use in array-based analyte detection applications, particularly in array-based hybridization assays.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

The subject invention is a method of depositing a quantity of a fluid sample onto the surface of an array. Specifically, the subject invention provides a method of depositing an extremely small quantity of a fluid sample, e.g. a pico liter volume of fluid sample, onto the surface of an array. As the subject methods are capable of depositing an extremely small volume of fluid onto an array surface, the subject methods can be used to deposit a pico liter quantity of fluid onto an array surface. By "pico liter quantity" is meant a volume of fluid that is at least about 0.05 pl, usually at least about 0.1 pl and more usually at least about 1 pl, where the volume may be as high as 250 pl or higher, but generally does not exceed about 1 µl and usually does not exceed about 1 nl.

In the broadest sense, the subject methods may be used to deposit a volume of fluid sample onto any structure having at least one binding agent stably associated with its surface. Generally, the structures onto which the fluid sample is deposited in the subject methods comprise a substrate surface having at least one location thereon occupied by a composition made up of a single type of binding agent, e.g. identical proteins, nucleic acids with the same sequence, etc., where this homogenous composition is present on the substrate surface in the form a spot or some other shape. In many embodiments, the subject methods are employed to deposit a volume of fluid sample onto the surface of an array. Arrays onto which fluid sample is deposited in the subject methods are compositions of matter having a plurality of distinct binding agents, e.g. probes, stably associated with a substrate surface, where the plurality of binding agents is generally known and positioned across the surface of the array in a pattern. Each distinct binding agent present on the array is generally a member of a specific binding pair. Binding agents of interest are generally biological molecules or biomolecules and include: polypeptides, nucleic acids, carbohydrates, glycoproteins, etc. As such, binding pairs in which one member thereof is stably associated to the array surface include: ligands and receptors; antibodies and antigens; complementary nucleic acids; etc. As mentioned above, the plurality of binding agents are arranged across the surface of a substrate in the arrays. Typically, the arrays comprise a plurality of spots, where each spot contains a different and distinct binding agent, i.e. the arrays comprise a plurality of homogenous binding agent compositions, where each composition is in the form of a spot on the substrate surface of the array. The number of spots on a substrate surface in any given array varies greatly, where the number of spots is at least about 1, usually at least about 10 and more usually at least about 100, and may be as great as 100,000 or greater, but usually does not exceed about $10^7$ and more usually does not exceed about $10^6$. The spots may range in size from about 0.1 µm to 10 mm, usually from about 1 to 1000 µm and more usually from about 10 to 100 µm. The density of the spots may also vary, where the density is generally at least about 1 spot/cm$^2$, usually at least about 100 spots/cm$^2$ and more usually at least about 400 spots/cm$^2$, where the density may be as high as $10^6$ spots/cm$^2$ or higher, but generally does not exceed about $10^5$ spots/cm$^2$ and usually does not exceed about $10^4$ spots/cm$^2$. A variety of arrays are known to those of skill in the art, where representative arrays include those disclosed or referenced in: U.S. Pat. Nos. 5,242,974; 5,384,261; 5,405,783; 5,412,087; 5,424,186; 5,429,807; 5,436,327; 5,445,934; 5,472,672; 5,527,681; 5,529,756; 5,545,531; 5,554,501; 5,556,752; 5,561,071; 5,624,711; 5,639,603; 5,658,734; as well as in WO 93/17126; WO 95/11995; WO 95/35505; EP 742 287; and EP 799 897; the disclosures of which are herein incorporated by reference. Of particular interest in many embodiments of the subject methods is the deposition of a fluid sample onto arrays of nucleic acids, including arrays of oligonucleotides and polynucleotides, e.g. cDNAs.

In certain embodiments, the arrays employed in the subject methods are those in which two or more distinct regions are present on the surface of the array, where fluid communication between regions is prevented by a barrier means. A variety of barrier means may be present, including raised structures or walls arising from the surface of the array, hydrophobic strips of material positioned on the array surface in a manner sufficient to produce two or more distinct regions, and the like. Such arrays are described in U.S. Pat. Nos. 5,545,531 and 5,807,522, the disclosures of which are herein incorporated by reference.

The fluid sample that is deposited on the array according to the subject invention is a fluid sample that is suspected of containing an analyte of interest. In other words, the fluid sample may or may not actually contain the analyte of interest, where the purpose of the array-based assays in which the methods of the subject invention find use is to determine whether or not the sample has the analyte of interest. The analyte of interest, e.g. target, is generally a biomolecule, where by biomolecule is meant a molecule that is a naturally occurring molecule associated with an agent that is capable of replication, either by itself or with the use of other organisms, e.g. viruses, single-celled organisms and multi-celled organisms; including animals and plants. Biomolecules therefore include polypeptides, polysaccharides, nucleic acids and the like, as well as derivatives thereof, where of particular interest in many embodiments are nucleic acids, including oligonucleotides and polynucleotides, e.g cDNA.

The fluid sample is generally derived from a physiological fluid, e.g. naturally occurring fluids, such as plasma, tears, urine, etc., derivatives of cells or tissues, e.g. cell lysates, etc., where the fluid may or may not be pre-treated to produce the sample. Examples of pre-treatments to which the original fluid may be subjected in order to produce the sample include dilution, concentration, labeling, denaturation, etc., where such protocols are well known to those of skill in the art. Generally, the fluid sample is an aqueous fluid sample, where the fluid sample may or may not include one or more additional agents, such as co-solvents, buffering salts, surfactants, ions, denaturants, enzymes etc.

In many embodiments, the fluid sample deposited on the array surface in the subject methods is a nucleic acid fluid sample. By nucleic acid fluid sample is meant a fluid sample that contains a nucleic acid, usually a plurality of distinct nucleic acids, where the nucleic acids may be oligonucleotides, polynucleotides, e.g. mRNAs, cDNAs, etc. In many preferred embodiments, the nucleic acid fluid sample contains a plurality of distinct labeled derivatives of mRNAs from a physiological sample, e.g. cell or tissue of interest, where labeled derivatives include cDNA, a RNA, etc.

Critical to the subject method is the use of a thermal inkjet head to deposit a quantity of the fluid sample onto the array surface. Thermal inkjet heads are well known in the art of conventional printing and document production. As is known to those of skill in the art, thermal inkjet heads typically have at least the following components: (a) an orifice; (b) a firing chamber; and (c) a heating element. Thermal inkjet heads and methods for their manufacture and use are described in a number of different U.S. patents, including: U.S. Pat. Nos. 5,772,829; 5,745,128; 5,736,998; 5,736,995; 5,726,690; 5,714,989; 5,682,188; 5,677,577;

5,642,142; 5,636,441; 5,635,968; 5,635,966; 5,595,785; 5,477,255; 5,434,606; 5,426,458; 5,350,616; 5,341,160; 5,300,958; 5,229,785; 5,187,500; 5,167,776; 5,159,353; 5,122,812; and 4,791,435; the disclosures of which are herein incorporated by reference.

Thermal inkjet heads finding use in the subject methods will generally have the following characteristics. The size of the orifice is sufficient to produce a spot of suitable dimensions on the substrate surface (described in greater detail infra), where the orifice generally has a diameter (or exit diagonal depending on the specific format of the ink jet head) ranging from about 1 to 1000 $\mu$m, usually from about 5 to 100 $\mu$m and more usually from about 10 to 60 $\mu$m. The firing chamber has a volume ranging from about 1 pl to 10 nl, usually from about 10 pl to 5 nl and more usually from about 50 pl to 1.5 nl. The heating element will preferably be made out of a material that can deliver a quick energy pulse, where suitable materials include: TaAl and the like. The thermal element is capable of achieving temperatures sufficient to vaporize a sufficient volume of the nucleic acid composition in the firing chamber to produce a bubble of suitable dimensions upon actuation of the head. Generally, the heating element is capable of attaining temperatures at least about 100° C., usually at least about 400° C. and more usually at least about 700° C., where the temperature achievable by the heating element may be as high as 1000° C. or higher. The device may also have one or more reservoirs. In other words, the device may be a single reservoir device or a multi-reservoir device. When present, the reservoir will typically have a volume ranging from about 1 pl to 1 l, usually from about 0.5 $\mu$l to 10 $\mu$l and more usually from about 1 $\mu$l to 5 $\mu$l. A variety of thermal inkjet heads are available commercially, where such devices include: the HP92261A thermal inkjet head (available from Hewlett-Packard Co., Palo Alto Calif.), the HP 51645A thermal inkjet head (available from Hewlett-Packard Co. Palo Alto Calif.), the inkjet produced by (Cannon Kabushiki Kaisha, Tokyo, Japan) and the like. Specific inkjet heads of interest are disclosed in U.S. Pat. Nos. 5,736,998 and 4,668,052, the disclosures of which are herein incorporated by reference.

In practicing the subject methods, the thermal inkjet device is loaded with a fluid sample, e.g. a nucleic acid fluid sample. The fluid may be loaded into the firing chamber and fluid reservoir using any convenient means. Thus, conventional methods of introducing ink into thermal inkjet heads may be employed. Where such methods are employed, following loading of the fluid sample into the inkjet head, it is often desirable to "prime" the device prior to use. One means of priming the device is to apply sufficient pressure to the fluid in the reservoir (or conversely negative pressure to the orifice) such that a volume of fluid is forced out of the orifice. Such priming methods are currently employed in the printing industry and thus are well known to those of skill in the art.

Alternatively, where minimal waste of the fluid sample desired, e.g. where the fluid is an expensive or rare cDNA sample, the following method of loading the fluid sample into the firing chamber and reservoir may be employed. In this method of fluid sample loading, the orifice is contacted with the fluid under conditions sufficient for fluid to flow through the orifice and into the firing chamber of the head, where fluid flow is due, at least in part, to capillary forces. To assist in the flow of fluid into the orifice, back pressure in the form of suction (i.e. negative pressure) may be applied to the firing chamber (and reservoir, if present) of the head, where the back pressure will typically be least about 5, and may be at least about 10 and even as great as about 100 inches of H$_2$O or more.

To deposit fluid onto the surface of an array according to the subject methods, the fluid sample loaded thermal inkjet head is positioned in opposing relationship relative to the surface of the array (e.g. with an XYZ translational means), where the orifice is in opposition to the position on the array surface at which deposition of the nucleic acid is desired (e.g. opposite a binding agent spot on the array). The distance between the orifice and the array surface will not be so great that the volume of nucleic acid fluid cannot reach the array surface and produce a spot in a reproducible manner. As such, the distance between the orifice and the array surface will generally range from about 10 $\mu$m to 10 mm, usually from about 100 $\mu$m to 2 mm and more usually from about 200 $\mu$m to 1 mm.

After the head is placed into position relative to the array surface, the temperature of the heating element or resistor of the head is raised to a temperature sufficient to vaporize a portion of the fluid immediately adjacent to the resistor and produce a bubble. In raising the temperature of the heating element, the temperature of the heating element is raised to at least about 100° C., usually at least about 400° C. and more usually at least about 700° C., where the temperature may be raised as high as 1000° C. or higher, but will usually be raised to a temperature that does not exceed about 2000° C. and more usually does not exceed about 1500° C. As such, a sufficient amount of energy will be delivered to the resistor to produce the requisite temperature rise, where the amount of energy will generally range from about 1.0 to 100 $\mu$J, usually from about 1.5 to 15 $\mu$J. The portion of fluid in the firing chamber that is vaporized will be sufficient to produce a bubble in the firing chamber of sufficient volume to force an amount of liquid out of the orifice.

The formation of the bubble in the firing chamber traps a portion or volume of the fluid present in the firing chamber between the heating element and the orifice and forces an amount or volume of fluid out of the orifice at high speed. The amount or volume of fluid that is forced out of the firing chamber can be controlled depending on the specific amount of fluid that is desired to be deposited on the substrate. As is known in the art, the amount of fluid that is expelled can be controlled by changing one or more of a number of parameters of the ink jet head, including: the orifice diameter, the orifice length (depth), the size of the firing chamber, the size of the heating element, and the like. Such variations are well known to those of skill in the art. As such, the amount or volume of fluid that is forced out or expelled from the firing chamber may range from about 0.1 to 2000 pl, usually from about 0.5 to 500 pl and more usually from about 1.0 to 250 pl. The speed at which the fluid is expelled from the firing chamber is at least about 1 m/s, usually at least about 10 m/s and may be as great as about 20 m/s or greater.

Upon actuation of the thermal inkjet head, as described above, fluid is expelled from the orifice and travels to the array surface. Upon contact with the array surface, the fluid interacts with the binding agent(s) located at the position of the array on which the fluid is deposited. The deposited fluid typically forms a spot on the array surface. As mentioned above, by varying the design parameters of the thermal inkjet head, the spot dimensions can be controlled such that spots of various sizes can be produced. With the subjects methods, one can produce spot sizes which have diameters ranging from a minimum of about 10 $\mu$m to a maximum of about 1.0 cm. In those embodiments where very small spot sizes are desired, one can produce small spots that have a diameter ranging from about 1.0 $\mu$m to 1.0 mm, usually from about 5.0 $\mu$m to 500 $\mu$m and more usually from about 10 $\mu$m to 200 μm. In many embodiments, the spot sizes range from about 30 to 100 μm.

An important feature of the subject invention is that the deposition process does not adversely affect the binding capabilities of the analyte (if present) in the sample with its respective binding pair member present on the array. For example, where the analyte is a nucleic acid, the deposited nucleic acid is capable of hybridizing to complementary nucleic acids present on the array. In other words, the deposition process does not adversely affect the nucleic acid of the sample, e.g. does not physically alter the nature of the nucleic acid such that it cannot subsequently participate in Watson-Crick type hydrogen bonding interactions.

The subject methods of depositing a volume of fluid sample onto the surface of a array find use in a variety of different array-based applications. Array-based applications in which the subject invention finds use include: differential expression analysis, gene discovery, and the like. A variety of array-based applications are described in: U.S. Pat. Nos. 5,242,974; 5,384,261; 5,405,783; 5,412,087; 5,424,186; 5,429,807; 5,436,327; 5,445,934; 5,472,672; 5,527,681; 5,529,756; 5,545,531; 5,554,501; 5,556,752; 5,561,071; 5,624,711; 5,639,603; 5,658,734; as well as WO 93/17126; WO 95/11995; WO 95/35505; EP 742 287; and EP 799 897; the disclosures of which are herein incorporated by reference.

Although the exact steps in any given array-based application in which the subject methods find use will vary depending on the particular assay being performed, the following steps are generally present. First, the thermal inkjet head comprising the fluid sample is positioned and fired so as to deposit a volume of fluid sample onto the array surface at a desired location, as described supra. Following deposition of the fluid sample onto the array surface, the deposited fluid is maintained on the array surface for a sufficient period of time for specific binding interactions to occur between specific binding pair members, e.g. complementary nucleic acids. This incubation period typically lasts at least about 1 min, usually at least about 1 hr and more usually at least about 3 hr, where the incubation period may last as long as 24 hr or longer, but generally will not be longer than 20 hr and usually will not be longer than 16 hr. In certain embodiments, because of the small sample volumes that are deposited, the incubation time may be very short, ranging from about 1 to 30 min, usually from about 10 to 30 min.

In many embodiments, any unbound binding agents present on the array surface are removed following incubation. Unbound binding agents may be removed using any convenient washing protocol, where a wash fluid, e.g. a wash solution, is contacted with the array surface and removed. Washing protocols that may be employed include: immersing the array in a wash solution, flowing a wash solution over the service of the array, etc. In certain embodiments, the wash fluid is deposited on the array using a thermal inkjet head in a manner analogous to that employed for deposition of the sample volume.

Depending on the particular assay being performed, the particular protocol may include one or more of the following additional steps. In certain embodiments, the fluid sample present in the inkjet head is pre-heated prior to deposition. Where the fluid sample is pre-heated, the fluid sample is heated to a temperature of at least about 25, usually at least about 37 and more usually at least about 50° C., where the fluid sample may be heated to a temperature as high as 100° C. or higher, but is generally not heated to a temperature that exceeds about the boiling temperature of the solution, and is usually not heated to a temperature that exceeds about 95° C. The fluid sample is conveniently heated by administering short bursts of energy to the heating element of the inkjet head. The short bursts of energy are sufficient to heat the fluid sample to the desired temperature, but insufficient to result in the formation of a vapor bubble in the inkjet head of sufficient to volume to expel a quantity of fluid from the inkjet head. As such, the short bursts of energy are sufficient to raise the temperature of the solution to 25 to 100, usually to 30 to 90 and more usually to 37 to 50° C. To achieve this heating, a plurality of bursts of energy are delivered to the heating element.

In certain embodiments, it is desirable to deposit a quantity of a diluent solution, e.g. water, buffer solution, etc., onto the array surface at the same location that the fluid sample is deposited. The diluent may be deposited before and/or after the deposition of the fluid sample. Deposition of the diluent solution may serve a number of different purposes, including; dilution of the fluid sample to achieve a desired concentration; introduction of additional fluid to provide for an optimal binding environment during incubation; mixing of the deposited sample (e.g. by drop impact mixing, etc) and the like. The diluent may be deposited from a thermal inkjet head according to the subject methods, where the diluent may be present in a single reservoir head or a multi-reservoir head that also includes the fluid sample.

As described above, the array onto which the fluid sample is deposited comprises a plurality of binding agents located at distinct positions, e.g. spots, on the substrate surface of the array. Depending on the particular protocol being performed and the size of each binding agent location or spot on the array, the ratio of fluid sample depositions per binding agent location, i.e. drops per spot, may be 1, greater than 1 or less than 1. For example, where the array has spots of 500 μm diameter on the surface, one can deposit a single fluid sample drop on each spot. This particular embodiment is depicted in FIGS. 1A and B, which show a plurality of sample depositions into a single spot. The ability to deposit a plurality of distinct sample drops onto a single spot comes is a result of the precise manner in which the subject invention is capable of depositing small volumes of fluid sample. Alternatively, one could deposit a plurality of drops onto each spot, where plurality means 2 or more, but usually does not exceed about 100,000 and more usually does not exceed about 1000. Alternatively, in high density arrays where the spots are small, e.g. ranging in diameter from about 1 μm to 200 μm, a single fluid sample drop may be deposited such that a plurality of spots are covered by the deposited drop of fluid sample.

In certain embodiments, it may be desirable to prevent evaporation of the fluid sample following deposition. Evaporation may be prevented in a number of different ways. The subject methods may be carried out in a high humidity environment. By "high humidity" is meant an environment in which the humidity is at least about 86% relative humidity, usually at least about 95% relative humidity and more usually at least about 99% relative humidity. Alternatively, one may apply an evaporation retarding agent, e.g. mineral oil, glycerol solution, polyethylene glycol, etc., over the surface of the deposited sample, e.g. by using a thermal inkjet as described above.

In the course of practicing the subject methods, fluid contacted arrays are produced in which each deposited fluid volume occupies a small area, i.e. spot, on the array surface. By small is meant that each fluid sample spot on the array has a diameter that is at least about 1 μm, usually at least about 5 µm and more usually at least about 10 µm and does not exceed about 10 mm, usually does not exceed about 1000 µm and more usually does not exceed about 200 µm.

Also provided by the subject invention are automated devices for depositing fluid samples on an array surface, e.g. for carrying out array-based assays. The automated devices of the subject invention are analogous to conventional thermal inkjet printing devices, with the exception that the thermal inkjet head of the device is filled with a fluid sample as described above, instead of ink. Such automatic devices comprise at least a for precisely controlling the position of the head with respect to an array surface (an XYZ translational mechanism) and for firing the head. Such automated devices are well known to those of skill in the printing and document production art, and are disclosed in U.S. Pat. Nos. 5,772,829; 5,745,128; 5,736,998; 5,736,995; 5,726,690; 5,714,989; 5,682,188; 5,677,577; 5,642,142; 5,636,441; 5,635,968; 5,635,966; 5,595,785; 5,477,255; 5,434,606; 5,426,458; 5,350,616; 5,341,160; 5,300,958; 5,229,785; 5,187,500; 5,167,776; 5,159,353; 5,122,812; and 4,791,435; the disclosures of which are herein incorporated by reference.

Also provided by the subject invention are kits for use in depositing a fluid sample on a substrate according to the subject methods. The subject kits include at least a thermal inkjet head and instructions for practicing the subject invention, where the instructions may be present as a package insert or on the packaging of the device. The subject kits may further include various reagents for preparing the fluid sample. In some embodiments, the kits may also comprise the array onto which the fluid sample is to be deposited.

The following examples are offered by way of illustration and not by way of limitation.

EXPERIMENTAL

EXAMPLE I

The following experiment is performed to profile the expression levels of both very rare and abundant transcripts in four different cellular states relative to a fifth reference state with an array-based hybridization assay using a single array.

A. Experimental Setup

Each of four samples contains a population of nucleic acids representing the transcript profile of the reference state and a population of nucleic acids representing the transcript profile of one of the four alternative states, such as cells grown under four different conditions, isolated from four different patients, or treated with four different drug candidates. The representatives from the reference state are labeled with one fluorophore and the representatives from each of the other states are labeled with a second different fluorophore. The samples are highly concentrated, each in 2 µl of hybridization buffer solution containing 1.0 M NaCl, 10 mM Tris-HCl (pH 7.6), 0.005% Triton X-100 and 0.1 mg/ml unlabeled, sonicated herring sperm DNA. In addition, 10% polyethylene glycol is added to slow evaporation. A diluent solution is also used that is identical in composition to the sample solutions but lacks the fluorescently labeled nucleic acid. Analysis of the samples is to be done by hybridization to an array of nucleic acid receptors specific for individual transcripts of interest. The receptors are arrayed in 400 micron features or spots on a coated glass slide with a total of 4,800 different features. The array is held on a surface of controlled temperature to regulate the temperature of the glass. The samples and diluent are delivered to the array using a multi-reservoir thermal inkjet head attached to an XYZ positioning system. The head utilized, HP 51 645A (available from Hewlett-Packard Co. Palo Alto, Calif.), fires 35 pl drops which cover 3800 micron$^2$ on the surface.

B. Experimental Procedure

The four sample solutions and the diluent are manually applied in separate locations to a transfer surface. The inkjet head is moved over the solutions and loads them through the orifice plate into the firing chamber. The head is then scanned across the array and 9 firings of diluent solution (d in FIG. 1 A) are deposited into each of four spots within each of the features or spots, 10 and 20. After the diluent is deposited, the sample solutions are warmed to 95° C. by applying short pulses of energy to the firing resistors. The head then deposits one firing of each sample solution into its own spot of diluent in each feature, 10 or 20, as well as one firing of each sample solution into a discrete spot without dilution (FIG. 1 B). Thus, within each feature, 10 or 20, there are eight separate regions covered with liquid. Each region contains a single sample solution at one of two concentrations, the initial concentration or ten percent of the initial concentration. FIGS. 1A and 1B show one possible arrangement of firings; others are possible.

After incubation at 37° C. for one hour, the array is washed with hybridization buffer at 37° C. for one hour, followed by washing with a solution containing 0.07 M NaCl, 5 mM $H_2PO_4$, 0.5 mM EDTA, and 0.005% Triton X-100 at 50° C. for 15 minutes. Finally, the array is analyzed by laser epifluorescent microscopy, and the signal within each sample region of each feature is quantified for the two fluorescent labels. In the concentrated solutions, which afford the highest signal from rare transcripts, the labeled representatives of abundant transcripts saturate their respective surface-bound receptors, limiting the quantitative information that can be derived for those transcripts. In the diluted solutions, the rarest transcripts detectable in the concentrated solutions are not detectable, but more quantitative information is available for the abundant transcripts-labeled representatives which no longer saturate their surface-bound receptors.

It is evident from the above results and discussion that a simple and efficient way to deposit fluid samples onto arrays during array-based assays is provided by the subject invention. By using the subject methods, very small volumes of fluid can be deposited quickly on an array surface, which is especially useful where small or valuable samples are being employed. Furthermore, the subject invention is a non-contact process such that the potential contamination and surface disruption that could arise from contact of an applicator with the substrate surface is eliminated. Yet another advantage of the subject invention is that the fluid sample can be precisely placed on the array. In addition, deposition of the fluid sample using the subject methods can result in very rapid reaction times and therefore short incubation times, thereby speeding up the overall time required for performing an array-based assay. As such, the subject invention is a significant contribution to the art.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. A method for screening a fluid sample at least suspected of containing a nucleic acid, for said at least suspected nucleic acid, by depositing a quality of said fluid sample onto a nucleic acid array comprising a plurality of nucleic acids stably attached onto an array surface, said method comprising:

positioning a thermal inkjet head filled with said at least suspected nucleic acid containing fluid sample in opposing relation to said array surface;

actuating said thermal inkjet head in a manner sufficient to expel said quantity of fluid sample onto said array surface to deposit said quantity of fluid sample on said array surface, wherein nucleic acids present in said deposited fluid are capable of hybridizing to their nucleic acid complement; and detecting any binding complexes on said array surface between any nucleic acids present in said fluid sample and any nucleic of said array to screen said sample for said at least suspected nucleic acid.

2. The method according to claim 1, wherein said fluid is heated prior to said actuation.

3. The method according to claim 1, wherein an energy pulse of between 1.0 to 100 $\mu J$ is supplied to the thermal inkjet head to expel the quantity of fluid.

4. A method for depositing a quantity of fluid containing a nucleic acid onto a nucleic acid array comprising a plurality of nucleic acids stably attached onto an array surface, said method comprising:

loading said fluid into a thermal inkjet head comprising an orifice and a firing chamber by contacting said orifice with said fluid in a manner sufficient for said fluid composition to flow through said orifice into said firing chamber;

positioning said thermal inkjet head filled with said fluid in opposing relation to said array surface; and actuating said thermal inkjet head in a manner sufficient to expel said quantity of fluid onto said array surface to deposit said quantity of fluid on said array surface, wherein nucleic acids present in said deposited fluid are capable of hybridizing to their nucleic acid complement.

5. The method according to claim 4, wherein said method further comprises applying back pressure to said head during said contacting step.

6. A method for introducing a fluid sample at least suspected of containing a nucleic acid to a nucleic acid to screen said fluid sample for said at least suspected nucleic acid, said method comprising:

positioning a thermal inkjet head filled with said fluid sample in opposing relation to a surface of an array, wherein said array comprises a plurality of nucleic acid stably attached onto said surface;

actuating said thermal inkjet head in a manner sufficient to expel a quantity of said fluid sample onto said array surface wherein nucleic acids present in said deposited fluid are capable of hybridizing to their nucleic acid complement; and allowing interaction between said fluid sample and said nucleic acid to screen said fluid sample for said at least suspected nucleic acid.

7. The method according to claim 6, wherein an energy pulse of between 1.0 to 100 $\mu J$ is supplied to the thermal inkjet head to expel the quantity of fluid.

8. The method according to claim 6, wherein an energy pulse of between 1.5 to 15 $\mu J$ is supplied to the thermal inkjet head to expel the quantity of fluid.

9. A method for detecting the presence of a nucleic acid in a fluid sample containing said nucleic acid, said method comprising:

positioning a thermal inkjet head filled with said fluid sample in opposing relation to a surface of an array, wherein said array comprises a plurality of nucleic acids stably attached onto said surface and at least one of said nucleic acids specifically hybridizes to said nucleic acid in said fluid sample;

actuating said thermal inkjet head in a manner sufficient to expel a quantity of said fluid sample onto said array surface wherein nucleic acid present in said deposited fluid are capable of hybridizing to their nucleic acid complement; and detecting the presence of any binding complexes on said array surface between said at least one nucleic acid and said nucleic acid in said fluid sample on said array surface;

whereby the presence of said analyte in said fluid sample is detected.

10. The method according to claim 9, wherein between 1.0 to 100 $\mu J$ is supplied to the thermal inkjet head to expel the quantity of fluid.

11. The method according to claim 10, wherein between an energy pulse of 1.5 to 15 $\mu J$ is supplied to the thermal inkjet head to expel the quantity of fluid.

12. The method according to claim 9, wherein said method further comprises heating said fluid sample prior to acid actuating.

13. The method according to claim 9, wherein said fluid sample comprises a surfactant.

14. A method for performing an array-based hybridization assay, said method comprising:

(a) positioning a thermal inkjet head filled with a fluid nucleic acid sample in opposing relation to a surface of an array, wherein said array comprises a plurality of nucleic acids stably associated with said surface;

(b) actuating said thermal inkjet head by supplying an energy pulse of between 1.0 to 100 $\mu J$ so as to expel a quantity of said fluid sample onto said array surface to produce a sample contacted array;

(c) maintaining said sample contacted array under hybridization conditions for a period of time sufficient for any complementary nucleic acids to hybridize to each other;

(d) washing the surface of said array; and (e) detecting the presence of any double-stranded nucleic acids on said array surface.

15. The method according to claim 14, wherein said method further comprises heating said fluid sample prior to said actuating.

16. The method according to claim 14, wherein said quantity does not exceed 200 pico liters.

17. The method according to claim 14, wherein the energy pulse is between 1.5 to 15 $\mu J$ and the fluid sample contains a surfactant.

18. The method according to claim 14 additionally comprising depositing from a thermal inkjet head a quantity of a diluent solution onto a same location on the array as the quantity of sample fluid.

19. A method for depositing a quantity of fluid containing a nucleic acid or polypeptide onto an array surface having a plurality of nucleic acids or polypeptides stably associated therewith, said method comprising:

loading said fluid containing nucleic acid or polypeptide into a thermal inkjet head comprising an orifice and a firing chamber by contacting said orifice with said fluid in a manner sufficient for said fluid to flow through said orifice into said firing chamber;

positioning said thermal inkjet head filled with said nucleic acid or polypeptide containing fluid in opposing relation to said substrate; and actuating said thermal inkjet head in a manner sufficient to expel a quantity of said fluid onto said substrate surface to deposit said quantity of fluid on said substrate surface.

20. The method according to claim 19, wherein said method further comprises applying back pressure to said during said contacting step.

21. The method according to claim 19, wherein said fluid is heated prior to said actuation.

22. The method according to claim 19, wherein an energy pulse of between about 1.0 to 100 $\mu J$ is supplied to said thermal inkjet head to expel the quantity of fluid.

23. The method according to claim 19, wherein said quantity ranges from about 0.1 to 2000 pico liters.

* * * * *